Figure 1:
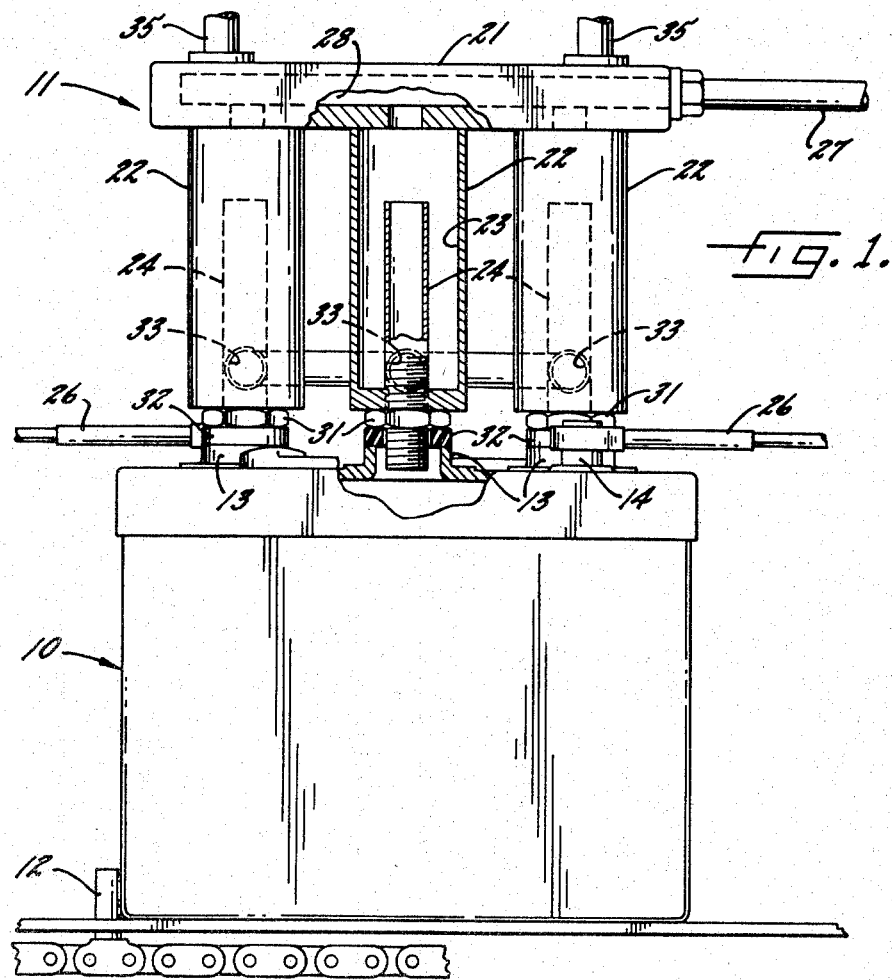

United States Patent [19]
Asta

[11] 3,753,786
[45] Aug. 21, 1973

[54] METHOD AND APPARATUS FOR ADJUSTING BATTERY ELECTROLYTE CONCENTRATION

[75] Inventor: Thomas J. Asta, St. Paul, Minn.
[73] Assignee: Gould Inc., Mendota Heights, Minn.
[22] Filed: Mar. 29, 1972
[21] Appl. No.: 239,023

[52] U.S. Cl. ............... 136/161, 136/162, 136/176
[51] Int. Cl. .................................... H01m 45/00
[58] Field of Search ................. 136/161, 34, 176, 136/162, 67, 160, 165

[56] References Cited
UNITED STATES PATENTS

| | | | |
|---|---|---|---|
| 2,274,118 | 2/1942 | Altmayer | 136/162 |
| 2,637,836 | 5/1953 | Kendall et al. | 136/165 |
| 2,732,985 | 1/1956 | Howard | 136/162 |
| 3,249,132 | 5/1966 | Eberle | 136/162 |

Primary Examiner—Donald L. Walton
Attorney—C. Frederick Leydig, Phillip H. Mayer et al.

[57] ABSTRACT

After formation, a substantial portion of the dilute acid electrolyte is driven from each cell of a lead acid battery by applying a charging current to the battery and a vacuum chamber to each cell. An adjustable amount of this electrolyte is separated for removal from each cell by a standpipe, and the remaining electrolyte is returned to the respective cells. A fixed amount of high acid concentration electrolyte is then added to each cell so that the resulting mix is at the desired acid concentration level for normal operation of the battery. By adjusting the amount of removed dilute electrolyte in accordance with battery size and capacity, a proper final acid concentration level results from adding a given amount of high concentration acid to the cells of each size and type of battery.

4 Claims, 2 Drawing Figures

METHOD AND APPARATUS FOR ADJUSTING BATTERY ELECTROLYTE CONCENTRATION

This invention relates generally to the manufacture of lead acid electrical storage batteries and more particularly concerns adjusting the concentration of electrolyte in such batteries.

Lead acid batteries go through a formation step following assembly to appropriately modify the active electrode materials in the plates, and formation conventionally involves charging the battery while it contains low acid concentration electrolyte under controlled time, current and temperature conditions. After formation, the acid concentration of the electrolyte must be brought up to an optimum value for proper battery operation.

To adjust electrolyte acid concentration, normal practice calls for physically turning the battery upside down to dump out the free dilute formation electrolyte, adding electrolyte whose acid concentration is higher than that finally desired, and mixing the added electrolyte with the non-pourable formation electrolyte unavoidably retained, because of the container and cover configuration, and in the plate and separator structure of the battery. The aimed at result is an electrolyte mix at the proper acid concentration level.

It will be apparent that under such normal practice the amount of electrolyte retained in an inverted battery will vary depending on container and cover configuration, cell size and battery capacity, so that it is necessary to add different quantities and/or concentrations of electrolyte to different types of batteries. This complicates the manufacturing process, particularly when using automated equipment. Also, it is the fact that battery inverting machines, for that step in normal practice, are relatively expensive.

Accordingly, it is the primary aim of the invention to provide an improved method and apparatus for adjusting battery electrolyte concentration that avoids the need for a battery inverting machine. A related object of the invention is to provide a method and apparatus of the above type which is rapid in operation and inexpensive to assemble and operate.

Another object is to provide a method as characterized above which simplifies the adjusting of battery electrolyte concentration following formation.

Figure 2:
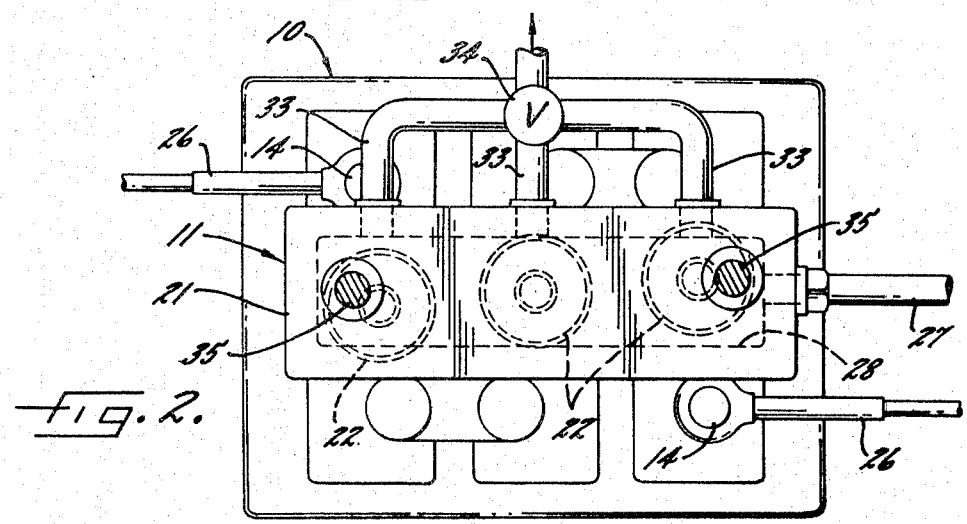

Other objects and advantages of the invention will become apparent upon reading the following detailed description and upon reference to the drawings, in which:

FIG. 1 is a somewhat schematic elevation of a portion of apparatus intended to perform the method of the invention; and FIG. 2 is a plan of the apparatus shown in FIG. 1.

While the invention will be described in connection with a preferred embodiment and procedure, it will be understood that I do not intend to limit the invention to that embodiment or procedure. On the contrary, I intend to cover all alternatives, modifications and equivalents as may be included within the spirit and scope of the invention as defined by the appended claims.

Turning to the drawing, there is shown a battery 10 at a battery manufacturing station employing apparatus 11 embodying and performing in accordance with the invention. The battery 10 is supported on a conveyor 12 and, in the illustrated case, has three cells, each opening upwardly through a vent 13, and a pair of electrical terminals 14. Each battery 10 brought to the station has completed the formation cycle and contains dilute acid electrolyte used for the formation process which must be adjusted to the higher acid concentration level desired for normal operation of the battery.

In accordance with one aspect of the invention, vacuum and a charging current are applied to the battery so as to drive out a uniform substantial portion of the dilute electrolyte, an adjusted amount of the dilute electrolyte is separated for removal and the remainder returned to each cell and, at subsequent stations, a fixed amount of concentrated acid electrolyte is added to each cell of the battery and mixed with the retained formation electrolyte so as to establish the desired acid concentration level for normal operation of the battery. The gassing caused by the charging current, coupled with the application of vacuum to each cell, will drive out approximately one-third to one-half of the total amount of formation electrolyte, and the amount driven out will be quite uniform from cell to cell in batteries of the same size and capacity. It will be understood that because of the normal close control over the formation cycle, the initial amounts of electrolyte in each cell will also be quite uniform. Thus, by separating and removing equal adjusted amounts of the electrolyte driven from each cell, the amount of dilute electrolyte retained in each cell will be uniform and closely controlled.

By varying the amount of formation electrolyte removed from the cells in accordance with the size and type of battery being processed, a fixed amount and concentration of high acid concentration electrolyte can be subsequently added to virtually all batteries, regardless of size and type, to achieve the desired operating electrolyte acid concentration level. In prior battery manufacturing methods, differing amounts and/or differing concentrations of electrolyte must be added to batteries of varying size and capacity to reach a proper acid concentration level because, as a practical matter, all formation electrolyte cannot be removed and the amount retained varies with the configuration, size and capacity of a battery.

By removing only an adjusted amount of formation electrolyte from each cell rather than trying to empty the battery, slight variations from cell to cell in how much dilute electrolyte is retained during the emptying step become minor precentages of the total amount of formation electrolyte remaining in each cell. This gives a much more uniform, relatively speaking, amount of dilute electrolyte which must be raised to the normal concentration level by the addition of an appropriate amount of electrolyte at a higher acid concentration level.

In carrying out the invention, the apparatus 11 includes a head 21 mounting a plurality of containers 22 each defining a chamber 23 and mounting an adjustable standpipe 24 adapted to be sealed over a respective cell, whereupon applying a charging current to the battery 10 and establishing a vacuum in the chambers 23 will drive electrolyte from the cells, up the standpipes 24 and into the chambers 23. Upon interruption of the application of vacuum and charging current, the electrolyte in the chambers below the upper edges of the standpipes 24 will now flow back into the respective cells from which it was driven, and hence each cell has removed from it that volume of electrolyte separated by the height of the standpipes. In the illustrated arrangement, cables 26 are connected to the terminals 14 to apply the high charging current, and vacuum is established in the chambers 23 by coupling a hose 27 from a source of vacuum, or atmosphere under greatly reduced pressure, to a passage 28 in the head 21 opening into the chambers 23.

The standpipes 24 are preferably tubes adjustably threaded into the bottom of the containers 22 so that their vertical height can be selectively varied, and lock nuts 31 on the threads of the standpipes can be tightened against the containers 22 to hold the adjusted positions. Annular resilient gaskets 32 are mounted on the lock nuts 31 so as to engage the cell vents 13 and establish a seal between the battery and the containers 23 with the standpipes opening into the cells.

The combination of vacuum in the chambers 23 and a charging current delivered by the cables 26 causes gassing in the cells of the battery 10 which drives electrolyte up the standpipes 24 and into the chamber 23, the electrolyte below the adjusted upper end of the standpipes 24 is separated, being unable to flow back into the respective cells when the current and vacuum is interrupted, and the separated electrolyte is removed through drainpipes 33 and a valve 34 which is closed during the vacuum applying interval and then opened immediately after the adjusted volumes of electrolyte have drained back to the cells.

Preferably, the apparatus 11 includes rods 35 which support and move the head 21 and the associated containers into and out of engagement with the batteries 10 at the underlying work station.

It can now be seen that a method and apparatus has been provided which permits adjusting the electrolyte acid concentration level in a battery without requiring the batteries to be inverted and which is capable of operating quite rapidly and economically. No substantial electrolyte drainage time need be provided to empty formation electrolyte from the battery and, during the practice of the method, electrolyte is driven from the battery cells in only a few seconds by the charging current and the application of vacuum. Since the apparatus 11 permits the amount of dilute formation electrolyte retained in the battery cells to be quite accurately adjusted, the manufacturing method can be set up to add uniform amounts of a uniformly high acid concentration electrolyte to the battery cells for mixing with the dilute formation acid electrolyte, and the amount and concentration added may be kept uniform by controlling the amount of dilute formation acid left in the cells of batteries having differing sizes or capacities.

I claim as my invention:

1. A method of adjusting battery electrolyte concentration in batteries containing dilute acid electrolyte comprising the steps of applying vacuum and a charging current to each battery so as to drive out of the battery a uniform substantial amount of said dilute electrolyte, separating for removal an adjusted amount of the electrolyte driven from the battery, discontinuing the application of vacuum and charging current so as to return the non-separated electrolyte to the battery, adding to each battery a fixed amount of concentrated acid electrolyte, and adjusting said adjusted amount of electrolyte so that the resulting mix of diluted and concentrated acid electrolyte in each battery is at the desired acid concentration level for normal operation of the batteries.

2. The method of claim 1 in which said batteries have a plurality of cells and including the steps of separately retaining the dilute electrolyte driven from each of said cells, and separating for removal an adjusted amount of electrolyte from each of said retained portions so that the remainder is returned to the cell from which it was driven.

3. An apparatus for adjusting the volume of electrolyte in the cell of a battery comprising, in combination, a container defining a chamber, a standpipe in said container opening said chamber downwardly, a gasket for establishing a seal between the battery and said container with the standpipe opening into the cell, means for establishing a vacuum in said chamber, and means for applying a charging current to said battery so that said current and said vacuum drives electrolyte from said cell, up said standpipe and into said chamber, whereby the amount of electrolyte that will flow back into the cell when said vacuum and said charging current is interrupted is determined by the height of said standpipe in said chamber.

4. The combination of claim 3 in which the height of said standpipe in said chamber can be selectively adjusted so as to vary the amount of electrolyte returned to the cell.

* * * * *